United States Patent
Toumikoski

(10) Patent No.: US 7,449,121 B2
(45) Date of Patent: Nov. 11, 2008

(54) METHOD AND ARRANGEMENT FOR REMOVAL OF SURFACE SCUM

(75) Inventor: Pekka Toumikoski, Rauma (FI)

(73) Assignee: Finnket Ju Invest Oy, Rauma (FI)

( * ) Notice: Subject to any disclaimer, the term of this patent is extended or adjusted under 35 U.S.C. 154(b) by 54 days.

(21) Appl. No.: 11/630,980

(22) PCT Filed: Feb. 28, 2005

(86) PCT No.: PCT/FI2005/000126

§ 371 (c)(1),
(2), (4) Date: Dec. 28, 2006

(87) PCT Pub. No.: WO2006/005788

PCT Pub. Date: Jan. 19, 2006

(65) Prior Publication Data

US 2007/0221587 A1    Sep. 27, 2007

(30) Foreign Application Priority Data

Jun. 29, 2004    (FI) .................................. 20040893

(51) Int. Cl.
*B01D 21/24* (2006.01)
(52) U.S. Cl. ....................... 210/776; 210/800; 210/525; 210/540
(58) Field of Classification Search ................. 210/776, 210/800, 523, 525, 526, 527, 528, 540, 541
See application file for complete search history.

(56) References Cited

U.S. PATENT DOCUMENTS

| | | | | |
|---|---|---|---|---|
| 2,337,859 A | * | 12/1943 | Stuller | 210/525 |
| 2,628,190 A | * | 2/1953 | Langdon | 210/525 |
| 2,824,645 A | * | 2/1958 | Griffith | 210/526 |
| 2,863,565 A | * | 12/1958 | Koeske et al. | 210/540 |
| 2,959,290 A | | 11/1960 | Montgomery | |
| 3,741,399 A | * | 6/1973 | Peterson | 210/525 |
| 4,011,164 A | * | 3/1977 | McGivern | 210/776 |
| 4,268,394 A | * | 5/1981 | Wolfe | 210/525 |
| 5,057,219 A | * | 10/1991 | Fujiwara | 210/525 |
| 5,200,079 A | * | 4/1993 | Schwartz et al. | 210/541 |

(Continued)

FOREIGN PATENT DOCUMENTS

DE    4006924 A1    9/1991

(Continued)

OTHER PUBLICATIONS

PCT/ISA/210—International Search Report.

(Continued)

*Primary Examiner*—Christopher Upton
(74) *Attorney, Agent, or Firm*—Venable LLP; Eric J. Franklin

(57) ABSTRACT

A method for removal of surface scum in an apparatus, which includes at least a first surface chute arrangement that exists in a liquid basin and which is meant for removal of surface scum. Surface scum is exhausted by an overflow arrangement belonging to the first surface chute arrangement and being based on a continuous flow, with which surface scum is overflown in at least two successive phases. Also an arrangement for removal of surface scum operating according to the method.

15 Claims, 7 Drawing Sheets

U.S. PATENT DOCUMENTS 5,395,526 A * 3/1995 Fujiwara et al. ............. 210/525
5,423,987 A * 6/1995 Fujiwara ..................... 210/525

FOREIGN PATENT DOCUMENTS

| | | |
|---|---|---|
| GB | 2021430 A | 12/1979 |
| JP | 2003236529 A | 8/2003 |
| WO | WO 2004088277 A2 | 10/2004 |

OTHER PUBLICATIONS

PCT/IPEA/409—International Preliminary Report on Patentability.
PCT/ISA/237—Written Opinion of the International Searching Authority.

* cited by examiner

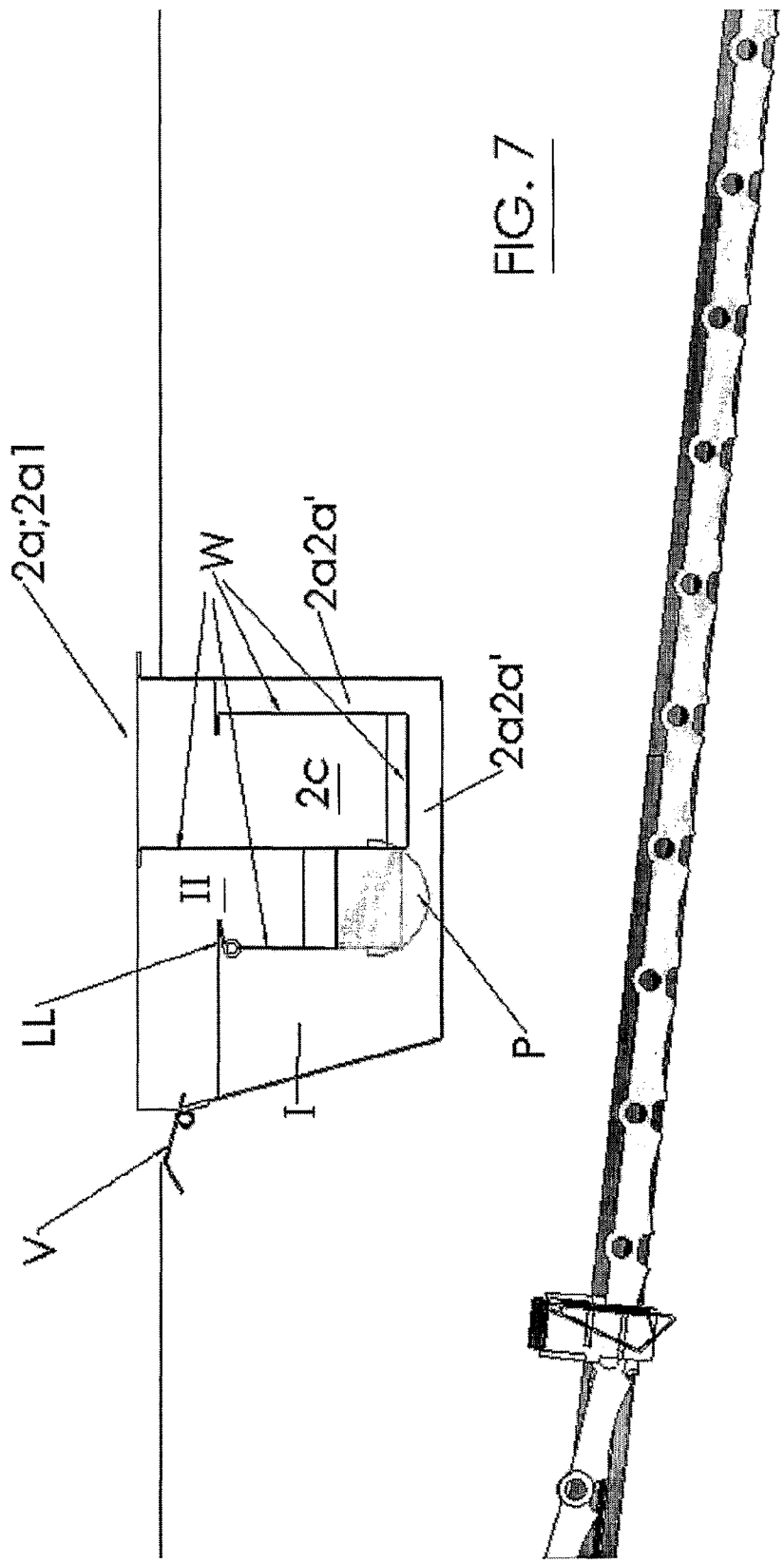

METHOD AND ARRANGEMENT FOR REMOVAL OF SURFACE SCUM

CROSS-REFERENCE TO RELATED APPLICATIONS

This application claims priority to Finnish patent application 20040893 filed 29 Jun. 2004 and is the national phase under 35 U.S.C. § 371 of PCT/FI2005/000126 filed 28 Feb. 2005.

FIELD OF THE INVENTION

The invention relates to a method for removal of surface scum in an apparatus, which comprises at least a first surface chute arrangement that exists in a liquid basin and which is meant for removal of surface scum.

BACKGROUND OF THE INVENTION

A traditional solution in the purpose described above and particularly in square shaped basins is such, that the fluid processing apparatus, such as a clarification basin or like, comprises usually a special kind of a scraper bar arrangement, which has several scraper bars, existing one after the other in the longitudinal direction of the basin, and movement means for moving the same, such as two chains, being placed parallelly and being driven by means of a drive wheel and idle wheel assembly, in connection with which the scraper bars are fastened removeably particularly in order to make easier the service and maintenance of the scraper bar arrangement. The type of scraper bar arrangements mentioned above are nowadays being used e.g. in connection with clarification basins in a way that the scraper bar/bars is/are transferred by chains, moving at opposite side or intermediate walls of the basin, alternatively on the surface and at the bottom of the basin, scraping sludge existing at the bottom to a sludge pocket while passing along the bottom, and, respectively guiding material existing on the surface to a collecting chute, which goes crosswise through the basin, while passing on the surface. There are also scraper bar arrangements, in which the bars are being moved e.g. by means of a carriage, moving above the basin, or e.g. by hydraulic arrangements. Also the shape of the basin may be in practice almost of whatever form.

In this connection, the surface scum is traditionally exhausted in a so to speak indirect manner, whereby the scrapers while passing on the surface, guide the material on the surface towards the collecting chute in a so called free-drifting manner. The collecting chutes, being used in this connection, are usually mechanically operated "suction chutes", which are being rotated from time to time around a longitudinal axis to a position, in which the surface scum is being "gulped" inside the same in order to lead it subsequently away from the liquid basin. On the other hand, in this connection a suction chute is used also, which has a moveable front wall, the operating principle of which is, however, in practice the same as described above.

A problem related to this kind of suction chutes is the fact that they take along too much surface water, which can thus drift along with the surface scum furthermore to the exhaustion channel of the surface scum. Also the bearing of such rotating suction structures to the walls of the basin is very difficult to carry out structurally, which is why among other things leaks are caused. In addition to the above, the suction chutes easily tend to get jammed among other things due to temperature differencies. The type of mechanically operated chute arrangements described above require naturally also operating devices and automation in order to move the chutes, which is why this kind of implementations require a very dense service and maintenance in order to keep them operable. Furthermore, a problem in practice related to this kind of solutions is due to exessive surface scum that gets collected on the surface of the liquid basin, together with which also other impurities may get collected. It is thus very usual that also organic processes may take place in the surface scum among other things in the form of algal growth.

SUMMARY OF THE INVENTION

It is the aim of the method according to the present invention to achieve a decisive improvement in the problems described above and thus to raise essentially the level of prior art. In order to carry out this aim, the method according to the invention is mainly characterized by that the surface scum is being exhausted by means of an overflow arrangement, belonging to the first surface chute arrangement and being based on a continuous flow, by means of which the surface scum is being overflown in at least two successive phases. It should be noted in this context that the surface water bringing the surface scum to the chute is just the same water, which is being moved to the overflow chutes, being placed after the suction chute, or to exhaust pipes, existing underneath the surface.

It is the aim of the method according to the present invention to achieve a decisive improvement in the problems described above and thus to raise essentially the level of prior art. In order to carry out this aim, the method according to the invention is mainly characterized by that the surface scum is being exhausted by means of an overflow arrangement, belonging to the first surface chute arrangement and being based on a continuous flow, by means of which the surface scum is being overflown in at least two successive phases. It should be noted in this context that the surface water bringing the surface scum to the chute is just the same water, which is being moved to the overflow chutes, being placed after the suction chute, or to exhaust pipes, existing underneath the surface.

As the most important advantage of the method according to the invention is first of all the fact that by means of an overflow arrangement, being based on a continuous flow with two phases, it is possible to eliminate all the problems related to moveable arrangements or corresponding mechanically operated exhaustion chutes, the most important thing thus being the possibility to minimize the amount of the surface water drifting along with the surface scum. In addition to the above, the area from which the surface scum is being removed can be adjusted by controlling the height of the primary space, belonging to the overflow arrangement, with respect to an overflow edge in the secondary space. This is enabled by using a flow balancing assembly, which comprises one or more pipes, channels or like, being connected to the arrangement removing clarified liquid from the primary space, and adjusting means for adjustment of the level of the liquid in the primary space. Furthermore the method according to the invention may be utilized also by an arrangement, which is totally independent on the level of the liquid basin, by enabling the overflow arrangement to settle freely in the direction of height along the level of the liquid basin e.g. by using floating arrangements.

In the dependent claims related to the method according to the invention advantageous embodiments of the method according to the invention have been presented.

The invention relates also to an arrangement for removal of surface scum operating according to the method.

As the most important advantages of the arrangement according to the invention may be mentioned simplicity and efficiency of its operating principle and use, whereby thanks to the same it is furthermore possible to avoid also the problems involved with traditional mechanical solutions. In spite of a continuous flow being exploited in the arrangement, with it it is also possible to eliminate removal of excessive liquid along with the surface scum. This is made possible first of all by means of an overflow arrangement, based on a two staged overflow, which comprises a primary space and a secondary space. On the other hand the final removal of the surface scum from the secondary space may be furthermore carried out in a totally controlled manner by exploiting a flow balancing assembly, by means of which the overflow of the surface scum from the primary space to the secondary space is being controlled in order to minimize the amount of liquid drifting along with the surface scum. In this way, it is possible to adjust the level of the primary space as desired e.g. by changing the discharge height of the flow pipe belonging to the flow balancing arrangement or by using a turnable flap structure in connection with an intermediate wall, separating the primary space and the secondary space from each other.

Thanks to the arrangement according to the invention, it is thus possible to minimize significantly the installation, service and maintenance measures related to traditional solutions, the arrangement operating independently and optimally in a way that excessive surface scum may not get collected in the liquid basin. On the other hand, thanks to the operating principle based on a continuous flow, the surface scum is also continuously on the run, which is why it may not become solid. Also formation e.g. of algal growth therewith is prevented.

Advantageous embodiments of the arrangement according to the invention have been represented in the dependent claims related to the same.

BRIEF DESCRIPTION OF THE DRAWINGS

In the following description the invention is being depicted in greater detail with reference to the appended drawings, in which in FIGS. 1, 2 and 3
is shown as a perspective view, a side view and an end view one advantageous arrangement operating according to the method according to the invention,
in FIGS. 4, 5 and 6
is shown as a perspective view, a side view and a front view one alternative embodiment in respect to the one mentioned above, and
in FIG. 7
is shown furthermore a longitudinal cross-section of a particularly advantageous integral overflow arrangement.

DETAILED DESCRIPTION OF EMBODIMENTS OF THE INVENTION

The invention relates to a method for removal of surface scum in an apparatus, which comprises at least a first surface chute arrangement 2a that exists in a liquid basin N and which is meant for removal of surface scum. Surface scum is being exhausted by means of an overflow arrangement 2a1, belonging to the first surface chute arrangement 2a and being based on a continuous flow, by means of which the surface scum is being overflown in at least two successive phases on the principle shown e.g. in FIGS. 1, 4 and 7.

Figure 4:
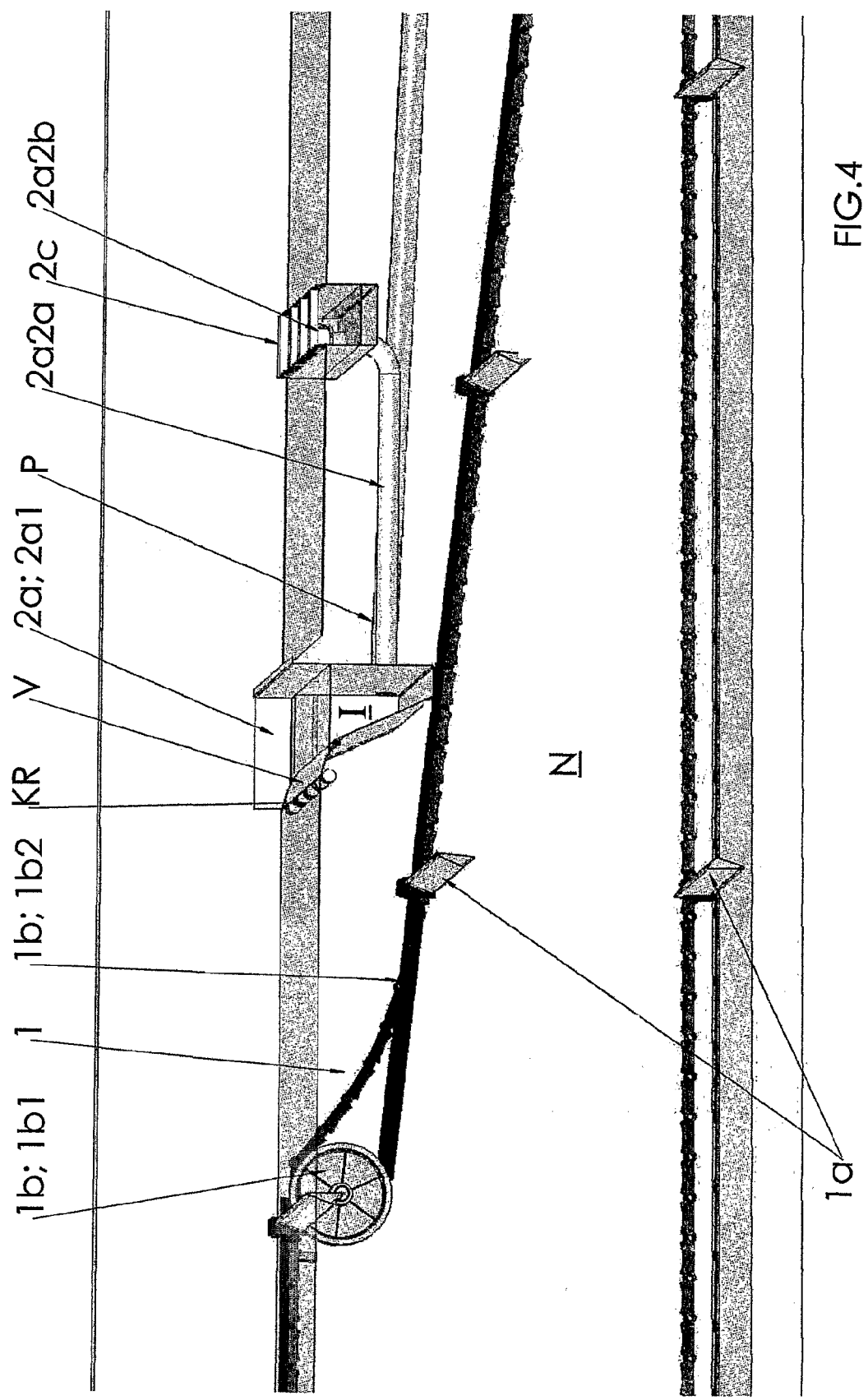
Figure 5:
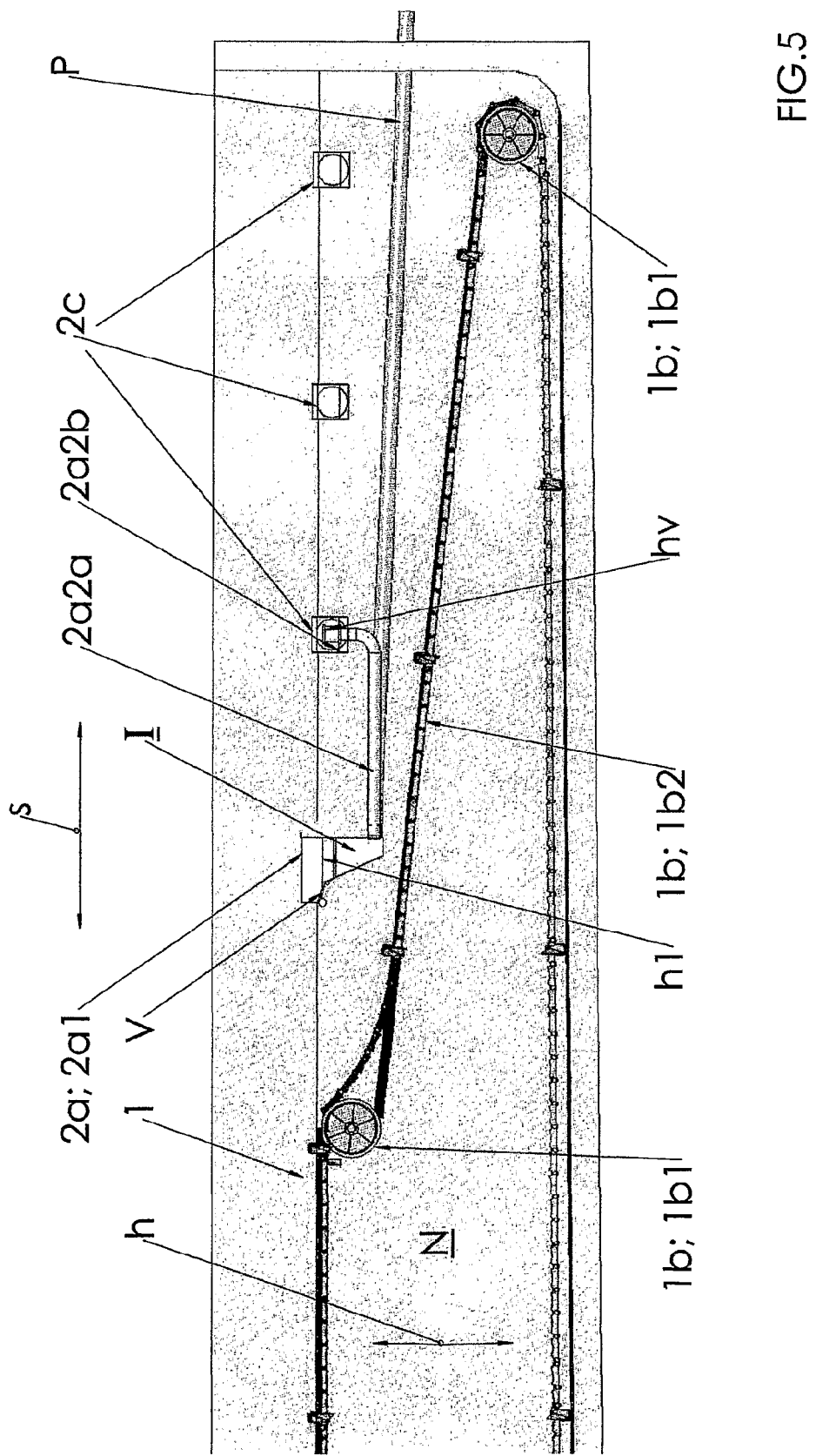
Figure 6:
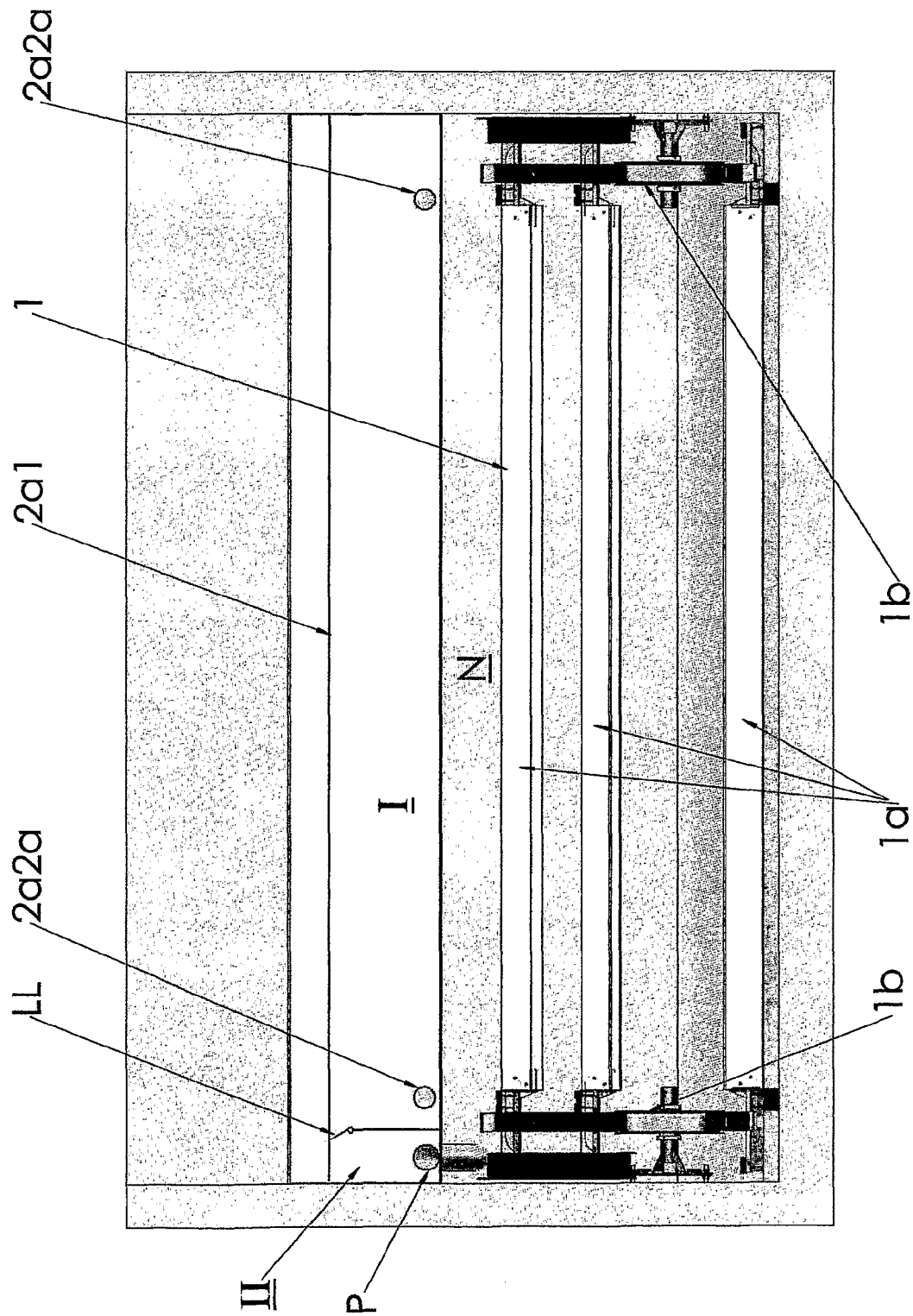

Especially with reference to FIGS. 4-6 the apparatus comprises furthermore a scraper bar arrangement 1 that moves in the liquid basin, such as a settling tank or like, and that is meant for scraping of material existing in the liquid basin to an exhaust arrangement 2, existing in connection with the liquid basin and comprising in addition to the first surface chute arrangement 2a, existing essentially in a crosswise direction with respect to the longitudinal direction s of the liquid basin, a bottom chute arrangement, existing at the bottom of the liquid basin and that is meant for removal of bottom sludge, and furthermore a second surface chute arrangement 2c for removal of liquid, being processed in the liquid basin, such as clarified water. As an advantageous embodiment the scraper bar arrangement 1 consists of one or more scraper bars 1a, existing one after the other in the longitudinal direction s and being adapted moveable by means of drive elements 1b, such as one or more transmission chains 1b2 or the like, being driven through the intermediary of a drive wheel and idle wheel arrangement 1b1 or in a like fashion, in connection with which the scraper bar/bars 1a is/are being fastened. With reference e.g. to FIGS. 1 and 4, the surface scum is being exhausted by means of the overflow arrangement 2a1 in a way, that the scum on the surface of the liquid basin is being overflown from the liquid basin N in a first phase by means of a downwardly sloping guide surface V to a primary space I, from which the surface scum is being overflown subsequently in a following phase to a primary space II, from which it is being exhausted finally from the liquid basin N by means of an exhaust assembly P for the surface scum, such as by one or more exhaust pipes, channels or like. The meaning of the downwardly sloping guide surface is to keep the flow of the surface scum, taking place along the same, as laminar as possible, so that it will remain on the surface in the primary space I.

As a further advantageous embodiment, the overflow of surface scum from the primary space I to the secondary space II is being controlled particularly in order to minimize the amount of water drifting together therewith by means of a flow balancing assembly 2a2, which comprises one or more flow pipes 2a2a, channels 2a2a' or like, being connected to the arrangement removing clarified liquid from the primary space I, such as the second surface chute arrangement 2c, and adjusting means 2a2b for adjustment of the level h1 of the liquid in the primary space I by means of an adjusting device LL existing in the wall defining the primary space I and the secondary space II or by an adjusting sleeve, existing at the end of said flow pipe, channel or like, which alters the discharge height hv of said flow pipe, channel or like. In this way it is possible to discharge surface liquid drifted from the liquid vessel directly to the arrangement removing clarified liquid.

The invention relates also to an arrangement for removal of surface scum in an apparatus of the type described above, the first surface chute arrangement 2a of which comprises an overflow arrangement 2a1, being based on a continuous flow for exhaustion of surface scum so that it is being overflown in at least two successive phases.

Figure 1:
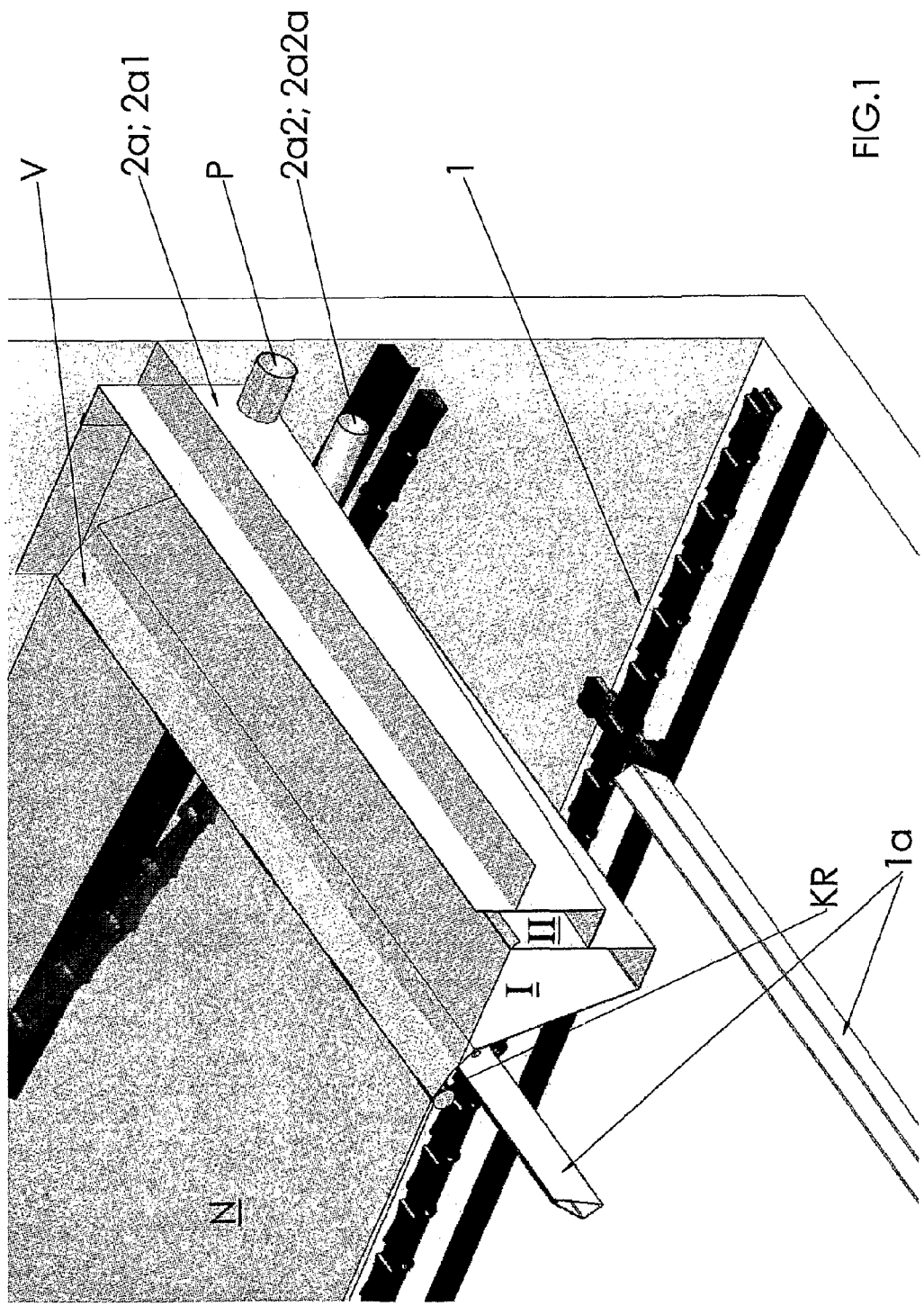

Especially with the advantageous embodiments shown in FIGS. 1, 4 and 7, the overflow arrangement 2a1 comprises a primary space I provided with a downwardly sloping guide surface V in order to get the scum on the surface of the liquid basin to get overflown in a first phase and a secondary space II in order to exhaust surface scum, being overflown in a second phase from the primary space I, finally from the liquid basin N by means of an exhaust assembly P for the surface scum, such as by one or more exhaust pipes, channels or like.

Figure 2:
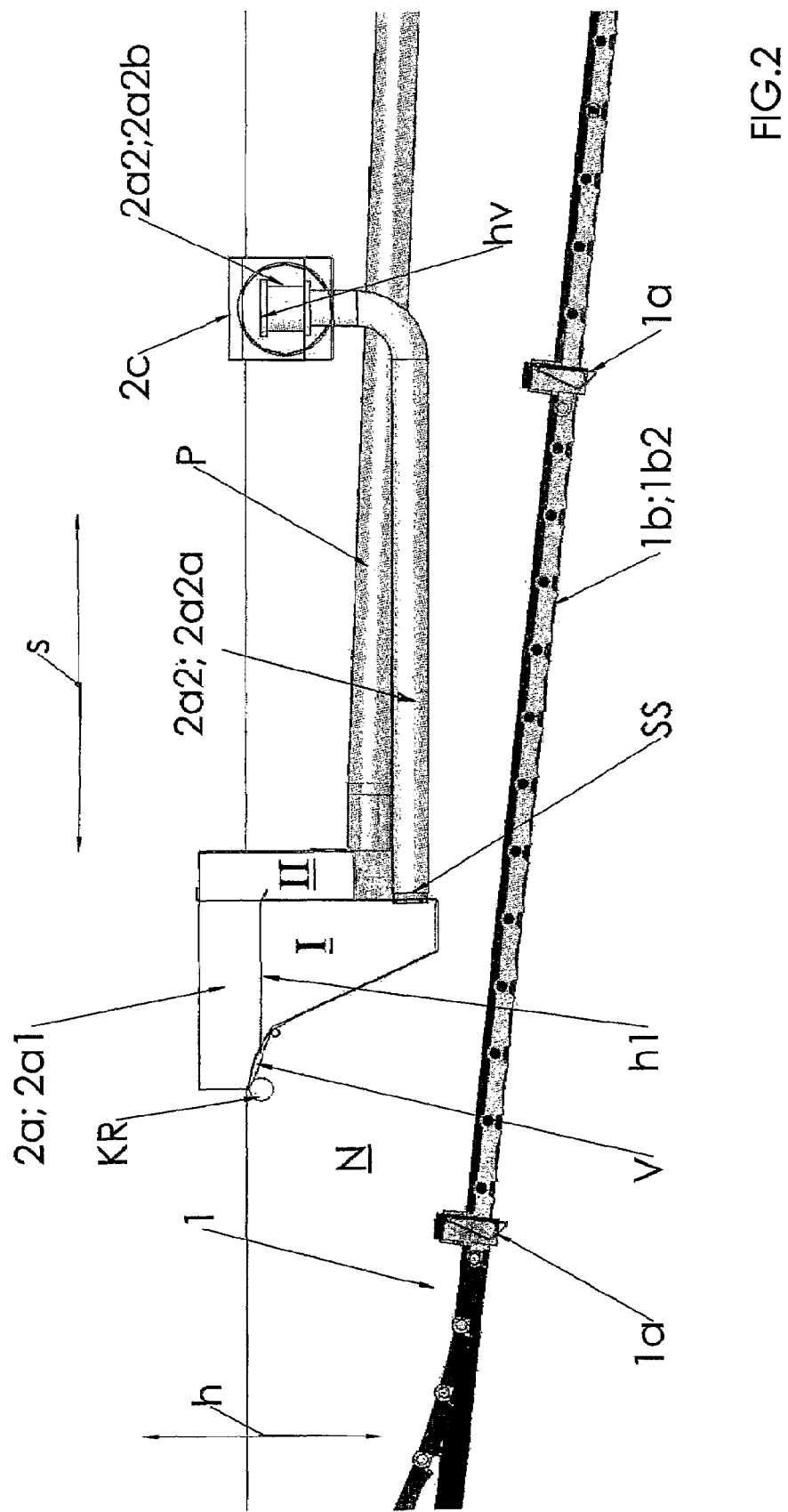

Furthermore as an advantageous embodiment, the arrangement comprises a flow balancing assembly 2a2 in order to control the overflow of the surface scum from the primary space I to the secondary space II particularly in order to minimize the amount of water drifting together therewith, which e.g. according to FIGS. 2, 5 and 7 comprises one or more flow pipes 2a2a channels 2a2a' or like, being connected to the arrangement removing clarified liquid from the primary space I, such as the second surface chute arrangement 2c, and adjusting means 2a2b for adjustment of the height h1 of the level of the liquid in the primary space I by means of an adjusting device LL existing in the wall defining the primary space I and the secondary space II or by an adjusting sleeve, existing at the end of said flow pipe, channel or like, which alters the discharge height hv of said flow pipe, channel or like. In this context it is also possible to use e.g. according to FIG. 2, filtering arrangements ss e.g. in the flow pipe 2a2a, by means of which entering of solid material to a so a called clear water side can be eliminated.

In the advantageous embodiment shown particularly in FIG. 7, the primary space I, the secondary space II, the flow balancing assembly 2a2 and at least a part of the second surface chute arrangement 2c, all belonging to its overflow arrangement 2a1, are arranged as an integral entirety, in which the primary space I, the secondary space II, said part of the second surface chute arrangement 2c and the flow channel 2a2a', belonging to the flow balancing assembly, all being placed one after the other in the longitudinal direction s, are limited from each other by mutual walls w.

Figure 3:
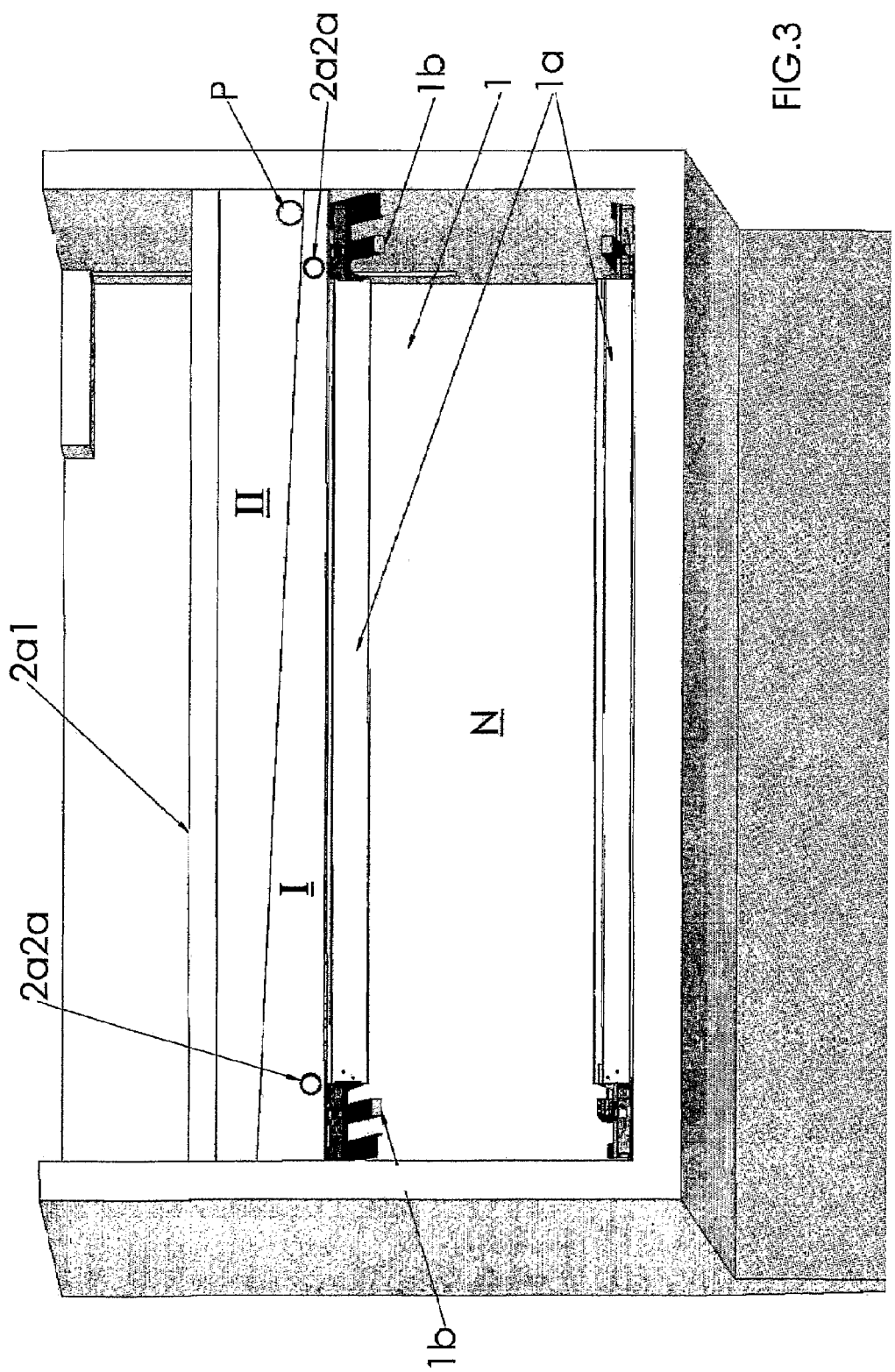

Furthermore as an advantageous embodiment with reference to the embodiment shown in FIGS. 1-3, the secondary space II is placed, when viewed in the longitudinal direction s of the liquid basin, transversely after the primary space I, so that it descends e.g. as shown in FIGS. 1 and 3 towards the exhaust assembly P of the surface scum, when viewed in the crosswise direction of the liquid basin.

As an alternative solution with respect to the above, with reference to the embodiment shown in FIGS. 4-6, the secondary space II is placed e.g. according to FIG. 6 at the end of the primary space I, when viewed in the crosswise direction of the liquid basin.

Furthermore as an advantageous embodiment, the overflow arrangement 2a1 for surface scum is arranged e.g. on the principle shown in FIGS. 1, 2, 4 and 5 to settle freely in a direction of height h along with the surface of the liquid basin by using floating structures KR or like.

Deviating from the embodiments shown in the appended drawings, it is naturally possible to couple a flow pipe 2a2a, channel 2a2a' or like, belonging to the flow balancing assembly 2a2, with a collecting channel/tunnel or like that removes clarified liquid from the liquid basin in a centralized manner.

It is clear that the invention is not limited to the embodiments presented or described above, but it can be modified within the basic idea of the invention in very many ways depending on the needs of any given time. Thus, the invention also relates at its widest to basins, which do not necessarily have any kind of a scraper bar arrangement and/or, in which the surface scum is being transferred by whatever arrangement toward the suction chute. There exists naturally a large amount of different kinds of scraper bar structures, in addition to which it is possible to use in connection with the same e.g. filling materials, e.g. based on polyurethane or like etc. Furthermore for the part of the overflow arrangement, it is possible to carry out the downwardly sloping guide surface by straight surfaces, getting deeper periodically, or e.g. by a continuously arched surface, which may be either convex or concave. In connection with the counterpart surface it is furthermore possible to use certain kinds of flow guidance arrangements, such as e.g. a perforated or grooved guide plate, by means of which the surface scum is being steered tangentially on the surface of the primary space. The surface scum may be removed from the secondary space also by means of e.g. a pump or by a separate scavenging or whatever way, in case it is required due to the quality or amount of the surface scum.

The invention claimed is:

1. A method for removal of surface scum with an arrangement comprising an overflow arrangement comprising a first surface chute arrangement arranged in a substantially crosswise direction with respect to a longitudinal direction of the liquid basin, the first surface chute comprising a primary space and a secondary space configured to let the surface scum overflow in at least two successive phases from the liquid basin into the primary space and from the primary space into the secondary space, an exhaust assembly operatively connected to the overflow arrangement to exhaust the surface scum, and a second surface chute, the method comprising:
controlling overflow of the surface scum from the primary space to the secondary space to minimize an amount of water drifting together with the surface scum by adjusting a level of the liquid in the primary space with at least one of a flow balancing assembly connecting the primary space and the second surface chute arrangement, or an adjusting device arranged in a wall defining the primary space and the secondary space.

2. The method according to claim 1, wherein the liquid basin comprises a settling tank.

3. The method according to claim 1, wherein the exhaust assembly comprises one or more exhaust pipes or channels.

4. The method according to claim 1, wherein the liquid processed in the liquid basin comprises clarified water.

5. The method according to claim 1, further comprising:
controlling the overflow of the surface scum from the primary space to the secondary space by adjusting a discharge height of one or more flow pipes or channels of the flow balancing assembly, with adjusting means arranged at the end of said exhaust assembly.

6. The method according to claim 5, wherein the adjusting means comprises an adjusting sleeve.

7. The method according to claim 5, wherein the liquid processed in the liquid basin comprises clarified water.

8. An arrangement for removal of surface scum from a liquid basin, the arrangement comprising:
an overflow arrangement comprising a first surface chute arrangement arranged in a substantially crosswise direction with respect to a longitudinal direction of the liquid basin, the first surface chute comprising a primary space and a secondary space configured to let the surface scum overflow in at least two successive phases from the liquid basin into the primary space and from the primary space into the secondary space;
an exhaust assembly operatively connected to the overflow arrangement to exhaust the surface scum;
a second surface chute configured to control overflow of the surface scum from the primary space to the secondary space to minimize an amount of water drifting together with the surface scum by adjusting a level of the liquid in the primary space; and
at least one of a flow balancing assembly connecting the primary space and the second surface chute or an adjusting device configured to control flow between the primary space and the secondary space.

9. The arrangement according to claim 8, wherein the arrangement comprises the flow balancing assembly, the flow balancing assembly comprising at least one flow pipe or channel, the arrangement further comprising:

adjusting means arranged at an end of the at least one flow pipe or channel of the flow balancing assembly, wherein the adjusting means is operative to adjust a discharge height of the flow balancing arrangement.

10. The arrangement according to claim 9, wherein the adjusting means comprises an adjusting sleeve.

11. The arrangement according to claim 8, wherein the secondary space is arranged, when viewed in the longitudinal direction of the liquid basin, transversely after the primary space, such that the secondary space descends towards the exhaust assembly, when viewed in a crosswise direction of the liquid basin.

12. The arrangement according to claim 8, wherein the secondary space is arranged at at least one end of the primary space, when viewed in a crosswise direction of the liquid basin.

13. The arrangement according to claim 8, wherein the overflow arrangement is arranged to settle freely in a direction of height along with the surface of the liquid basin by using floating structures.

14. The arrangement according to claim 8, wherein the liquid basin comprises a settling tank.

15. The arrangement according to claim 8, wherein the exhaust assembly comprises one or more exhaust pipes.

* * * * *